United States Patent

Himeno et al.

[11] Patent Number: 5,494,493
[45] Date of Patent: Feb. 27, 1996

[54] DISPERSE DYE MIXTURE

[75] Inventors: Kiyoshi Himeno; Toshio Hihara, both of Kitakyushu, Japan

[73] Assignee: Dystar Japan Ltd., Osaka, Japan

[21] Appl. No.: 346,187

[22] Filed: Nov. 22, 1994

[30] Foreign Application Priority Data

Dec. 20, 1993 [JP] Japan .................................. 5-344948

[51] Int. Cl.$^6$ ................................................ C09B 67/22
[52] U.S. Cl. ........................ 8/639; 8/662; 8/691; 8/693; 8/922; 8/549
[58] Field of Search ............................ 8/639, 662, 691, 8/693, 922, 549; 534/766, 773, 838

[56] References Cited

U.S. PATENT DOCUMENTS

| 3,950,321 | 4/1976 | Dehnert et al. | 260/156 |
| 4,650,860 | 3/1987 | Dehnert et al. | 534/766 |

FOREIGN PATENT DOCUMENTS

| 0084150 | 7/1983 | European Pat. Off. . |
| 0519459 | 12/1992 | European Pat. Off. . |
| 0548715 | 6/1993 | European Pat. Off. . |
| 0579192 | 1/1994 | European Pat. Off. . |
| 2187857 | 1/1974 | France . |
| 4329915 | 3/1995 | Germany . |

OTHER PUBLICATIONS

Database WPI, Derwent Publications, AN 91-048891, JP-A-03 002 275, Jan. 8, 1991.

*Primary Examiner*—Margaret Einsmann
*Attorney, Agent, or Firm*—Oblon, Spivak, McClelland, Maier & Neustadt

[57] ABSTRACT

A disperse dye mixture comprising dye (I) and dye (II) blended at a ratio of from 0.1 to 10 times by weight of dye (II) to dye (I):

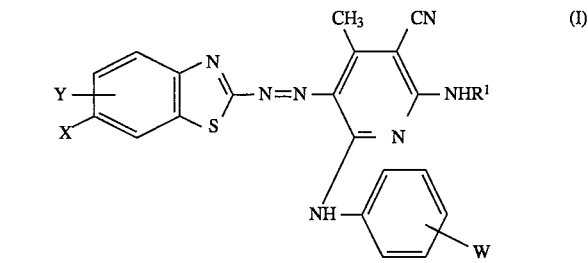

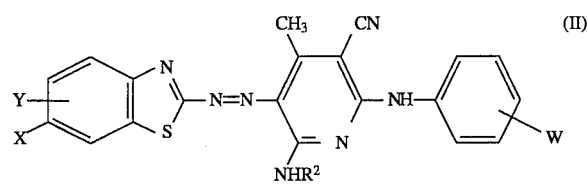

wherein X is halogen, nitro, cyano, thiocyanate, methylsulfonyl, $C_1$ or $C_2$ alkylcarbonyl, $C_1$-$C_4$ alkoxycarbonyl or vinylsulfonyl, Y is hydrogen, halogen, cyano, trifluoromethyl or methylsulfonyl, W is hydrogen, halogen, $C_1$ or $C_2$ alkyl or $C_1$ or $C_2$ alkoxy, and each of $R^1$ and $R^2$ which are independent of each other, is hydrogen, $C_1$—$C_8$ alkyl, or $C_2$-$C_4$ alkyl substituted by halogen, hydroxyl, cyano, alkoxy, alkoxyalkoxy, a hydroxyalkoxy, hydroxyalkoxyalkoxy, acyloxyalkoxy or acyloxyalkoxyalkyl, provided that each alkoxy has from 1 to 4 carbon atoms.

4 Claims, No Drawings

DISPERSE DYE MIXTURE

The present invention relates to a disperse dye which is excellent in light-fastness (color fastness to light) and temperature dependency and which is capable of dyeing polyester fibers and polyamide fibers in an excellent orange to bluish red color. Particularly, it relates to a disperse dye mixture especially suitable for dyeing polyester fibers.

In recent years, a demand for a disperse dye excellent in light-fastness and temperature dependency is high not only in the field of automobile seat material but also in the field of sport clothings employing Shin-Gosen textile material recently developed. However, heretofore, a dye excellent in both the light-fastness and temperature dependency has been rare, and no dye has been developed which is fully satisfactory in this respect. Especially, there has been no dye which is fully satisfactory as a dye to be used for dyeing fiber materials for automobile seats which are frequently exposed to extremely severe conditions.

For example, dyes represented by the following structural formulas (a) to (c) are disclosed in Examples 211, 213 and 215, respectively, of Japanese Examined Patent Publication No. 39347/1986, and a dye represented by the structural formula (d) is disclosed in Example 1 of Japanese Unexamined Patent Publication No. 2275/1991, and they are known as dyes excellent in light-fastness. However, they are inadequate in the dyeing temperature dependency and dyeability especially in a moderate dyeing depth.

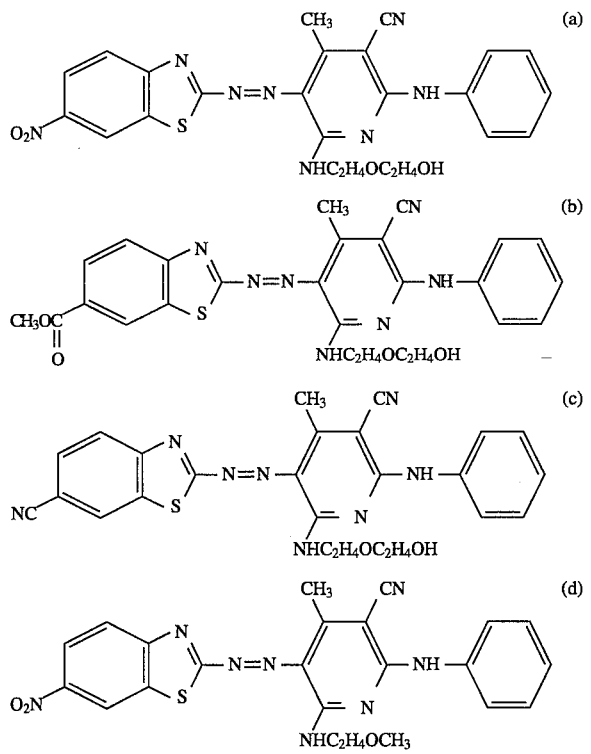

Under these circumstances, the present inventors have conducted various studies with an aim to provide a disperse dye which is excellent in both light-fastness and temperature dependency and which is suitable particularly for dyeing polyester fibers for automobile seats and polyester fibers of Shin-Gosen textile. Particularly, extensive studies have been made to improve the temperature dependency and dyeability while maintaining the excellent light-fastness of an orange to bluish red disperse dye of the following formula (I):

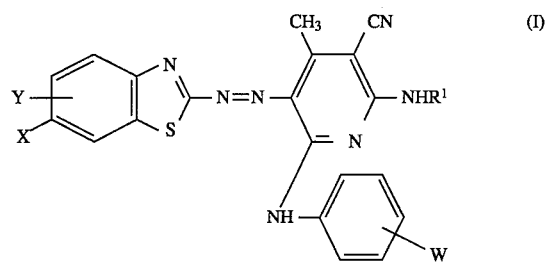

wherein X is a halogen atom, a nitro group, a cyano group, a thiocyanate group, a methylsulfonyl group, a $C_1$ or $C_2$ alkylcarbonyl group, a $C_1$–$C_4$ alkoxycarbonyl group or a vinylsulfonyl group, Y is a hydrogen atom, a halogen atom, a cyano group, a trifluoromethyl group or a methylsulfonyl group, W is a hydrogen atom, a halogen atom, a $C_1$ or $C_2$ alkyl group or a $C_1$ or $C_2$ alkoxy group, $R^1$ is a hydrogen atom, a $C_1$–$C_8$ alkoxyl group, or a $C_2$–$C_4$ alkyl group substituted by a halogen atom, a hydroxyl group, a cyano group, an alkoxy group, an alkoxyalkoxy group, a hydroxyalkoxy group, a hydroxyalkoxyalkoxy group, an acyloxyalkoxy group or an acyloxyalkoxyalkoxy group, provided that each alkoxy group has from 1 to 4 carbon atoms. As a result, the present invention has been accomplished.

Namely, the present invention provides a disperse dye mixture comprising a monoazo dye of the following formula (I) and a monoazo dye of the following formula (II) blended at a ratio of from 0.1 to 10 times by weight of the dye of the formula (II) to the dye of the formula (I):

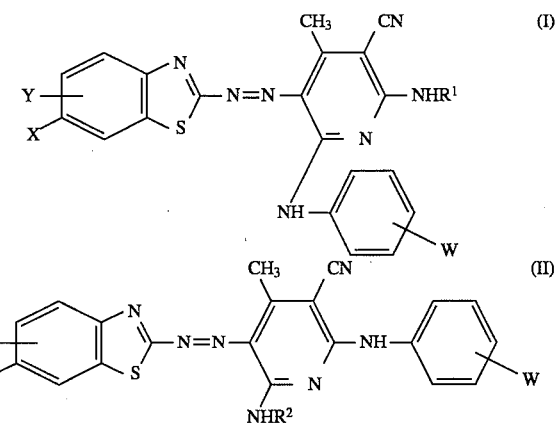

wherein X is a halogen:atom, a nitro group, a cyano group, a thiocyanate group, a methylsulfonyl group, a $C_1$ or $C_2$ alkylcarbonyl group, a $C_1$–$C_4$ alkoxycarbonyl group or a vinylsulfonyl group, Y is a hydrogen atom, a halogen atom, a cyano group, a trifluoromethyl group or a methylsulfonyl group, W is a hydrogen atom, a halogen atom, a $C_1$ or $C_2$ alkyl group or a $C_1$ or $C_2$ alkoxy group, and each of $R^1$ and $R^2$ which are independent of each other, is a hydrogen atom, a $C_1$–$C_8$ alkyl group, or a $C_2$–$C_4$ alkyl group substituted by a halogen atom, a hydroxyl group, a cyano group, an alkoxy group, an alkoxyalkoxy group, a hydroxyalkoxy group, a hydroxyalkoxyalkoxy group, an acyloxyalkoxy group or an acyloxyalkoxyalkoxy group, provided that each alkoxy group has from 1 to 4 carbon atoms.

Now, the present invention will be described in detail with reference to the preferred embodiments.

In the present invention, the disperse dyes of the formulas (I) and (II) are used in combination as a mixture. The blending ratio is such that the dye of the formula (II) is at a ratio of from 0.1 to 10 times by weight, preferably from 0.3 to 4 times by weight, to the dye of the formula (I).

If the amount of the dye of the formula (II) is too small or too large, the effects for improving the dyeability and temperature dependency are low. The dye of the formula (II) to be blended to the dye of the formula (I) may be a single dye or a mixture of dyes of the formula (II).

In the above formulas (I) and (II), X is a halogen atom, a nitro group, a cyano group, a thiocyanate group, a methylsulfonyl group, a $C_1$ or $C_2$ alkylcarbonyl group, a $C_1$–$C_4$ alkoxycarbonyl group or a vinylsulfonyl group. As the halogen atom, a chlorine atom or a bromine atom is preferred. X is preferably a halogen atom, a nitro group, a cyano group, a methylsulfonyl group or a vinylsulfonyl group, particularly preferably a halogen atom or a nitro group. Y is a hydrogen atom, a halogen atom, a cyano group, a trifluoromethyl group or a methylsulfonyl group. As the halogen atom represented by Y, a chlorine atom or a bromine atom is preferred. Particularly preferred is a combination wherein X is a halogen atom or a nitro group, and Y is a hydrogen atom or a halogen atom. W is a hydrogen atom, a halogen atom, a $C_1$ or $C_2$ alkyl group or a $C_1$ or $C_2$ alkoxy group, but particularly preferred is a hydrogen atom.

Each of $R^1$ and $R^2$ which are independent of each other, is a hydrogen atom, a $C_1$–$C_8$ alkyl group, or a $C_2$–$C_4$ alkyl group substituted by a halogen atom, a hydroxyl group, a cyano group, an alkoxy group, an alkoxyalkoxy group, a hydroxyalkoxy group, a hydroxyalkoxyalkoxy group, an acyloxyalkoxy group or an acyloxyalkoxyalkoxy group (provided that each alkoxy group has from 1 to 4 carbon atoms). Specifically, the $C_1$–$C_8$ alkyl group includes, for example, a methyl group, an ethyl group, and straight chain and branched propyl groups, butyl groups, pentyl groups, hexyl groups, heptyl groups and octyl groups. The $C_2$–$C_4$ alkyl group substituted by a halogen atom, a hydroxyl group or a cyano group includes, for example, a chloroethyl group, a bromoethyl group, a chloropropyl group, a bromopropyl group, a hydroxyethyl group, a hydroxypropyl group, a hydroxybutyl group, a cyanoethyl group and a cyanopropyl group. The $C_2$–$C_4$ alkyl group substituted by a $C_1$–$C_4$ alkoxy group includes, for example, a methoxyethyl group, an ethoxyethyl group, a butoxyethyl group, a methoxypropyl group, an ethoxypropyl group, a propoxypropyl group, a butoxypropyl group, a methoxybutyl group, an ethoxybutyl group and a butoxybutyl group. The $C_2$–$C_4$ alkyl group substituted by a $C_1$–$C_4$ alkoxy $C_1$–$C_4$ alkoxy group includes, for example, a methoxyethoxyethyl group, a methoxyethoxypropyl group, an ethoxyethoxyethyl group and an ethoxyethoxypropoxypropyl group. The $C_2$–$C_4$ alkyl group substituted by a hydroxyalkoxy group, a hydroxyalkoxyalkoxy group, an acyloxyalkoxy group or an acyloxyalkoxyalkoxy group (provided that each alkoxy group has from 1 to 4 carbon atoms) includes, for example, a hydroxyethoxyethyl group, a hydroxyethoxybutyl group, a hydroxypropoxyethyl group, a hydroxypropoxypropyl group, a hydroxybutoxyethyl group, a hydroxybutoxybutyl group, a hydroxyethoxyethoxyethyl group, a hydroxypropoxypropoxypropyl group, a formyloxyethoxyethyl group, a formyloxybutoxybutyl group, an acetyloxyethoxyethyl group, a propionyloxyethoxyethyl group, an acetyloxypropoxypropyl group, an acetyloxyethoxyethoxyethyl group and an acetyloxypropoxypropoxypropyl group.

The disperse dye mixture wherein in the formulas (I) and (II), each of $R^1$ and $R^2$ is a $C_1$–$C_4$ alkoxy $C_2$–$C_4$ alkyl group or a $C_1$–$C_4$ alkoxy $C_1$–$C_4$ alkoxy $C_2$–$C_4$ alkyl group, and the dye of the formula (II) is blended at a ratio of from 0.4 to 3 times by weight to the dye of the formula (I), is particularly excellent in the dyeability and temperature dependency. When this mixture is applied to an exhaustion dyeing method, particularly excellent dyeability and temperature dependency can be obtained.

Fibers which can be dyed by the disperse dye mixture of the present invention, may, for example, be polyester fibers made of e.g. polyethylene terephthalate or a polycondensation product of terephthalic acid and 1,4-bis(hydroxymethyl)cyclohexane. Such polyester fibers may be in the form of blended yarn products or combined filament yarn products with other fibers such as cotton, silk, wool, rayon, polyamide or polyurethane. In a case where the fibers are polyester fibers for automobile seats, polyester fibers of from 2 to 5 deniers are preferred, and in a case of fine denier polyester cloths for clothings, polyester fibers of from 0.1 to 1 denier are preferred.

The disperse dye mixture of the present invention is insoluble or hardly soluble in water. Accordingly, in case of dyeing the polyester fibers with the disperse dye mixture of the present invention, a dye bath or a printing paste is prepared by dispersing the mixture in an aqueous medium by using a dispersing agent such as a condensation product of naphthalene sulfonic acid with formaldehyde, a higher alcohol sulfuric acid ester or a higher alkylbenzene sulfonate in accordance with a conventional method, followed by dip dyeing or textile printing.

In the case of dip dyeing, a conventional dyeing treatment such as a high temperature dyeing method, a carrier dyeing method or a thermosol dyeing method, may be applied, whereby polyester fibers or blended yarn products thereof can be dyed with excellent color fastnesses. Better results may sometimes be obtained by adding a known acidic substance such as formic acid, acetic acid, phosphoric acid or ammonium sulfate to the dye bath. The pH of the dye bath is usually preferably adjusted within a range of from 5.0 to 9.5. The dyeing temperature may, for example, be at a level of from 120° to 140°.

There is no particular restriction as to the dyeing conditions for exhaustion dyeing. For example, the dyeing temperature is at a level of from 120° to 140° C., the dyeing time is from 30 to 60 minutes, and the pH of the dye bath is at a level of from 4.0 to 9.5.

Further, at the time of dyeing, various leveling agents and/or ultraviolet absorbers may be used in combination.

Now, the present invention will be described in further detail with reference to Examples. However, it should be understood that the present invention is by no means restricted by such specific Examples.

EXAMPLES 1 TO 5 AND COMPARATIVE
EXAMPLES 1 TO 5

0.75 g of one of red disperse dyes (1-1) to (1-5) as identified in Table 1, 0.75 g of one of red disperse dyes (2-1) to (2-5) as identified in Table 2 (Comparative Examples) or a dye mixture having a dye in Table 1 and a dye in Table 2 blended in the proportions as identified in Table 3 (Examples of the present invention), was dispersed in 3 l of water containing 2 g of a naphthalene sulfonic acid formaldehyde condensation product and 2 g of a higher alcohol sulfuric acid ester to obtain a dye bath. In this dye bath, 100 g of a polyester fiber cloth was dipped and dyed at 130° for 60 minutes, followed by soaping, washing with water and drying to obtain a red dyed cloth. The light-fastness, sublimation fastness and water fastness of the dyed cloth as well as the temperature dependency and pH dependency of the above dye during the dyeing operation were excellent in each case.

Further, the dye tinted to the cloth was dissolved and extracted with a 0.1% phosphoric acid solution in dimethylformamide and subjected to colorimetry, whereupon the dyeing depth (relative value) of each cloth in each Example and Comparative Example was calculated on the basis of the dyeing depth of Example No. 1-1 being 100 (standard) and shown in ! Table 3. Further, with respect to a cloth dyed under the same dyeing conditions as described above except that the dyeing temperature was changed to 120° C., the dyeing depth was calculated in the same manner, whereupon the temperature dependency was determined in accordance with the following formula. The results are shown in Table 3.

Temperature dependency (%) =

$$\frac{\text{Dyeing depth dyed at 120° C. for 60 minutes}}{\text{Dyeing depth dyed at 130° C. for 60 minutes}} \times 100$$

TABLE 1

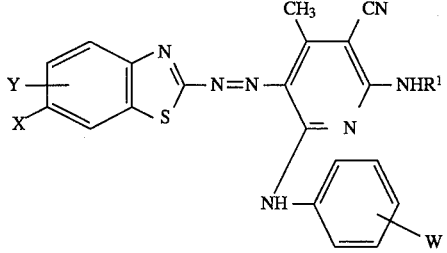

| Dye No. | $\underset{X}{Y}\!\!\!\begin{array}{c}\diagup\!\!\!\diagdown\\N\\S\end{array}\!\!\!-$ | $R^1$ | —W |
|---|---|---|---|
| (1-1) | 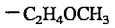 | —C₂H₄OCH₃ | —H |
| (1-2) | 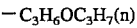 | —C₃H₆OC₃H₇(n) | —H |
| (1-3) |  | —C₂H₄OC₂H₄OCH₃ | —H |
| (1-4) | 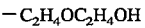<br>1:1 mixture | —C₂H₄OC₂H₄OH | —H |
| (1-5) | <br>1:1 mixture | —C₃H₆OC₃H₆OC₂H₅ | —H |

TABLE 2

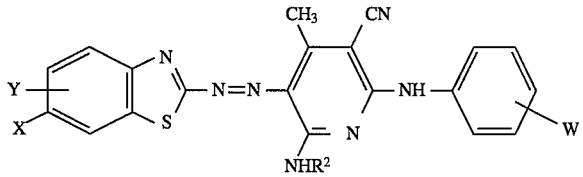

| Dye No. | X Y⟨benzothiazole⟩ | R² | —W |
|---|---|---|---|
| (2-1) | 6-O₂N-benzothiazole | —C₂H₄OCH₃ | —H |
| (2-2) | 6-CH₃SO₂-benzothiazole | —C₃H₆OC₃H₇(n) | —H |
| (2-3) | 4,6-diCl-benzothiazole | —C₂H₄OC₂H₄OCH₃ | —H |
| (2-4) | 6,7-diCl + 5,6-diCl benzothiazole (1:1 mixture) | —C₂H₄OC₂H₄OH | —H |
| (2-5) | 6,7-diBr + 5,6-diBr benzothiazole (1:1 mixture) | —C₃H₆OC₃H₆OC₂H₅ | —H |

TABLE 3

| Example No.* | Dyes used (g) | Dyeing depth | Temperature dependency (%) |
|---|---|---|---|
| 1-1 | (1-1) 0.75 | 100 | 50 |
| 1-2 | (2-1) 0.75 | 95 | 60 |
| 1 | (1-1) 0.6 (2-1) 0.9 | 115 | 80 |
| 2-1 | (1-2) 0.75 | 100 | 60 |
| 2-2 | (2-2) 0.75 | 95 | 70 |
| 2 | (1-2) 0.75 (2-2) 0.75 | 120 | 90 |
| 3-1 | (1-3) 0.75 | 100 | 60 |
| 3-2 | (2-3) 0.75 | 100 | 70 |
| 3 | (1-3) 0.9 (2-3) 0.6 | 125 | 90 |
| 4-1 | (1-4) 0.75 | 100 | 50 |
| 4-2 | (2-4) 0.75 | 100 | 45 |
| 4 | (1-4) 0.45 (2-4) 1.05 | 110 | 65 |
| 5-1 | (1-5) 0.75 | 100 | 35 |
| 5-2 | (2-5) 0.75 | 100 | 35 |
| 5 | (1-5) 0.2 (2-5) 1.3 | 110 | 55 |

*Example identified by a sub-number is a Comparative Example.

EXAMPLE 6

140 g of a lignin sulfonic acid-formaline condensation product and 650 g of water were mixed to 60 g of a disperse dye mixture comprising 50 parts by weight of red disperse dye No. (1-1) in Table 1 and 50 parts by weight of red disperse dye No. (2-1) in Table 2, and the mixture was pulverized in a wet milling by a sand grinder, followed by spray drying. To 0.07 g of this powdery disperse dye mixture, 0.08 g of a nonionic leveling agent (Diaserver® LR-PSL, manufactured by Mitsubishi Kasei Corporation), 0.10 g of an ultraviolet absorber (Sunlife LP-100, tradename, manufactured by Nicca Chemical Co., Ltd.) and 150 ml of water were added, and the resulting dye bath was adjusted to pH5.5. To the dye bath, 5 g of a polyester cloth was dipped and subjected to exhaustion dyeing at 130° C. for one hour, followed by soaping, washing with water and drying to obtain a bluish red-dyed cloth.

The light-fastness of this dyed cloth was measured by a JIS test method (JIS L-0843) modified for testing automobile seats (the temperature was 89° C.±5° C., a soft polyurethane foam (10 mm) was lined on the rear side of the test cloth, and the fastness was evaluated by the gray scale stipulated in JIS) and found to be grade 4$^+$

EXAMPLE 7

150 ml of water was added to 0.2 g of a powdery disperse dye mixture prepared in accordance with Example 6, and the resulting dye bath was adjusted to pH7. To this dye bath, 5 g of a fine denier polyester cloth (yarn size: 0.8 denier) was dipped and subjected to exhaustion dyeing at 135° C. for 60 minutes, followed by reduction clearing, washing with water and drying in accordance with conventional methods to obtain a red-dyed cloth. The light-fastness of this cloth was grade 5-6 (JIS L- 0843 method: 40 hr).

EXAMPLE 8 TO 29 AND COMPARATIVE EXAMPLES 8 TO 29

Dyeing and evaluation were conducted in the same manner as in Examples 1 to 5 and Comparative Examples 1 to 5 except that 1 g of one of the orange to bluish red disperse dyes as identified in Table 4 (Comparative Examples) or a dye mixture with the composition as identified in Table 4 (Examples of the present invention) was used. The light-fastness, sublimation fastness and water fastness of the obtained cloth as well as the temperature dependency and the pH dependency during dyeing were excellent in each case. Further, the dyeing depths and the temperature dependency obtained in the same manner as in Examples 1 to 5 are shown in Table 4.

TABLE 4

Structure (1):
A benzothiazole-azo-pyridine dye with substituents X, Y on benzothiazole; CH₃, CN, NHR¹ on pyridine; linked via =N- to phenyl bearing NH-C₆H₄-W.

Structure (2):
A benzothiazole-azo-pyridine dye with substituents X, Y on benzothiazole; CH₃, CN, NHR² on pyridine; linked via =N- to pyridine N, with NH-C₆H₄-W.

| Example No.* | [Structure] | —R¹ = —R² | —W | Dyes used (g) (1) | (2) | Dyeing depth | Temperature dependency (%) | Hue of polyester fibers |
|---|---|---|---|---|---|---|---|---|
| 8-1 | benzothiazole with O₂N, (2-CH₃) | —C₃H₆OCH₃ | H | 1 | — | 100 | 50 | Bluish red |
| 8-2 |  |  |  | — | 1 | 95 | 60 |  |
| 8 |  |  |  | 0.4 | 0.6 | 120 | 80 |  |
| 9-1 | benzothiazole with O₂N | —C₂H₄OC₂H₄OCH₃ | H | 1 | — | 100 | 55 | Bluish red |
| 9-2 |  |  |  | — | 1 | 100 | 65 |  |
| 9 |  |  |  | 0.5 | 0.5 | 125 | 90 |  |
| 10-1 | benzothiazole with O₂N | —C₂H₄OC₂H₄OH | —H | 1 | — | 100 | 35 | Bluish red |
| 10-2 |  |  |  | — | 1 | 95 | 40 |  |
| 10 |  |  |  | 0.3 | 0.7 | 115 | 55 |  |
| 11-1 | benzothiazole with Cl, O₂N | —C₄H₉(n) | m-Cl | 1 | — | 100 | 30 | Bluish red |
| 11-2 |  |  |  | — | 1 | 100 | 35 |  |
| 11 |  |  |  | 0.2 | 0.8 | 110 | 45 |  |
| 12-1 | benzothiazole with SO₂CH₃, O₂N | —C₂H₄OC₂H₄OCCH₃ (‖O) | o-CH₃ | 1 | — | 100 | 20 | Bluish red |
| 12-2 |  |  |  | — | 1 | 100 | 25 |  |
| 12 |  |  |  | 0.8 | 0.2 | 110 | 45 |  |

TABLE 4-continued

Structure (1):
Benzothiazole-N=N-[pyridine ring with CH₃, CN, NHR¹ substituents]-CH=N-C₆H₄-W with NH linkage, benzothiazole bearing X, Y substituents.

Structure (2):
Benzothiazole-N=N-[pyridine ring with CH₃, CN]-C(NHR²)=N-NH-C₆H₄-W, benzothiazole bearing X, Y substituents.

| Example No.* | Y—[benzothiazole]—X | —R¹ = —R² | —W | Dyes used (g) (1) | (2) | Dyeing depth | Temperature dependency (%) | Hue of polyester fibers |
|---|---|---|---|---|---|---|---|---|
| 13-1 | 4-Cl, 6-Cl | —C₄H₈OC₄H₈OCH₃ (with C=O) | —H | 1 | — | 100 | 50 | |
| 13-2 | | | | — | 1 | 100 | 50 | |
| 13 | | | | 0.6 | 0.4 | 120 | 80 | Scarlet |
| 14-1 | 6-CN | —C₂H₄OC₂H₄OH | m-Br | 1 | — | 100 | 25 | |
| 14-2 | | | | — | 1 | 100 | 25 | |
| 14 | | | | 0.4 | 0.6 | 115 | 50 | Bluish red |
| 15-1 | 4-Br, 6-Br | —C₃H₆OC₂H₅ | H | 1 | — | 100 | 45 | |
| 15-2 | | | | — | 1 | 95 | 45 | |
| 15 | | | | 0.4 | 0.6 | 120 | 75 | Bluish red |
| 16-1 | 4-Cl, 6-SO₂CH₃ | —C₃H₆OC₂H₄OCH₃ | H | 1 | — | 100 | 30 | |
| 16-2 | | | | — | 1 | 100 | 30 | |
| 16 | | | | 0.5 | 0.5 | 130 | 65 | Bluish red |
| 17-1 | 6-Cl | —C₂H₄CN | H | 1 | — | 100 | 35 | |
| 17-2 | | | | — | 1 | 95 | 30 | |
| 17 | | | | 0.9 | 0.1 | 110 | 50 | Scarlet |

TABLE 4-continued

Structure (1):

A pyridine-azo-benzothiazole dye with CH₃, CN, NHR¹ substituents on pyridine, connected via N=N to a benzothiazole bearing X, Y substituents, and an anilino group with W substituent.

Structure (2):

Similar pyridine core with CH₃, CN, NHR² substituents, with a =N- linked benzothiazole (X,Y) and NH-phenyl-W group.

| Example No.* | Y,X (benzothiazole) | —R¹ = —R² | —W | Dyes used (g) (1) | (2) | Dyeing depth | Temperature dependency (%) | Hue of polyester fibers |
|---|---|---|---|---|---|---|---|---|
| 18-1 | CN, (benzothiazole with CN, Cl) | —C₃H₆OC₄H₉(n) | —H | 1 | — | 100 | 25 | Red |
| 18-2 | | | | — | 1 | 100 | 25 | |
| 18 | | | | 0.5 | 0.5 | 120 | 50 | |
| 19-1 | H₂C=HCO₂S, (benzothiazole) | —C₂H₄OC₂H₄OCCH₃ (O=) | —H | 1 | — | 100 | 40 | Red |
| 19-2 | | | | — | 1 | 100 | 45 | |
| 19 | | | | 0.5 | 0.5 | 125 | 70 | |
| 20-1 | Br, Cl | —H | —H | 1 | — | 100 | 50 | Red |
| 20-2 | | | | — | 1 | 100 | 50 | |
| 20 | | | | 0.5 | 0.5 | 125 | 80 | |
| 21-1 | SCN | —C₃H₆OH | —H | 1 | — | 100 | 30 | Red |
| 21-2 | | | | — | 1 | 105 | 30 | |
| 21 | | | | 0.5 | 0.5 | 125 | 65 | |
| 22-1 | Cl, Cl / Cl, Cl | —C₃H₆OCH₃ | p-OCH₃ | 1 | — | 100 | 55 | Red |
| 22-2 | | | | — | 1 | 100 | 55 | |
| 22 | | | | 0.5 | 0.5 | 130 | 85 | |

*1:1 mixture

TABLE 4-continued

Structure (1):

Benzothiazole-N=N-[pyridine with CH₃, CN, NHR¹]-NH-C₆H₄-W

Structure (2):

Benzothiazole-N=N-[pyridine with CH₃, CN, NHR²]-NH-C₆H₄-W (with =N- in ring)

| Example No.* | Benzothiazole (1) | Benzothiazole (2) | —R¹ = —R² | —W | Dyes used (g) (1) | Dyes used (g) (2) | Dyeing depth | Temperature dependency (%) | Hue of polyester fibers |
|---|---|---|---|---|---|---|---|---|---|
| 23-1 | 4,5-diCl-benzothiazole (2-Me) | | —C₈H₁₇(n) | —H | 1 | — | 100 | 40 | Red |
| 23-2 | | 5,6-diCl-benzothiazole (2-Me) | | —H | — | 1 | 100 | 40 | |
| 23 | 1:1 mixture | | | | 0.1 | 0.9 | 105 | 50 | |
| 24-1 | 4,5-diCl-benzothiazole (2-Me) | | —C₄H₈OC₄H₉(n) | —H | 1 | — | 100 | 55 | Red |
| 24-2 | | 5,6-diCl-benzothiazole (2-Me) | | —H | — | 1 | 100 | 55 | |
| 24 | 1:1 mixture | | | | 0.5 | 0.5 | 125 | 80 | |
| 25-1 | 4,5-diCl-benzothiazole (2-Me) | | —C₄H₈OC₄H₈OH | —H | 1 | — | 100 | 35 | Red |
| 25-2 | | 5,6-diCl-benzothiazole (2-Me) | | —H | — | 1 | 100 | 35 | |
| 25 | 1:1 mixture | | | | 0.8 | 0.2 | 110 | 55 | |
| 26-1 | 4-CF₃-benzothiazole (2-Me) | | —C₂H₄OC₂H₅ | —H | 1 | — | 100 | 45 | Red |
| 26-2 | | 6-Cl-benzothiazole (2-Me) | | —H | — | 1 | 100 | 45 | |
| 26 | 1:1 mixture | | | | 0.7 | 0.3 | 115 | 65 | |

TABLE 4-continued

Structure (1):

A pyridine-based azo dye with substituents $CH_3$, $CN$, $NHR^1$, linked via $N=N$ to a benzothiazole bearing X, Y, and coupled to a phenyl ring bearing W through NH.

Structure (2):

A pyridine bearing $CH_3$, $CN$, with an anilino group (–NH–C$_6$H$_4$–W) and a –NHR$^2$ group, linked via an azomethine to a benzothiazole bearing X, Y.

| Example No.* | Y, X (benzothiazole) | –R¹ = –R² | –W | Dyes used (g) (1) | Dyes used (g) (2) | Dyeing depth | Temperature dependency (%) | Hue of polyester fibers |
|---|---|---|---|---|---|---|---|---|
| 27-1 | 2-methylbenzothiazole with CH₃C(=O)– substituent | –C₄H₈OH | –H | 1 | — | 100 | 45 | Red |
| 27-2 |  |  |  | — | 1 | 95 | 40 |  |
| 27 |  |  |  | 0.9 | 0.1 | 105 | 55 |  |
| 28-1 | 2-methylbenzothiazole with H₅C₂OC(=O)– substituent | –C₄H₈OC₂H₅ | –H | 1 | — | 100 | 50 | Red |
| 28-2 |  |  |  | — | 1 | 100 | 55 |  |
| 28 |  |  |  | 0.6 | 0.4 | 120 | 85 |  |
| 29-1 | 2-methylbenzothiazole with CN and Cl substituents | –C₃H₆OC₂H₄OCH₃ | –H | 1 | — | 100 | 55 | Bluish red |
| 29-2 |  |  |  | — | 1 | 100 | 50 |  |
| 29 |  |  |  | 0.5 | 0.5 | 125 | 85 |  |

As described in the foregoing, the present invention provides a dye mixture which is capable of dyeing polyester fiber material in a reddish color excellent in the light-fastness and which is excellent in the temperature dependency in dyeing. The resulting dyed product is useful particularly as fiber materials to be exposed to severe conditions such as fiber materials for automobile seats.

What is claimed is:

1. A disperse dye mixture comprising a monoazo dye of the following formula (I) and a monoazo dye of the following formula (II) blended at a ratio of from 0.1 to times by weight of the dye of the formula (II) to the dye of the formula (I):

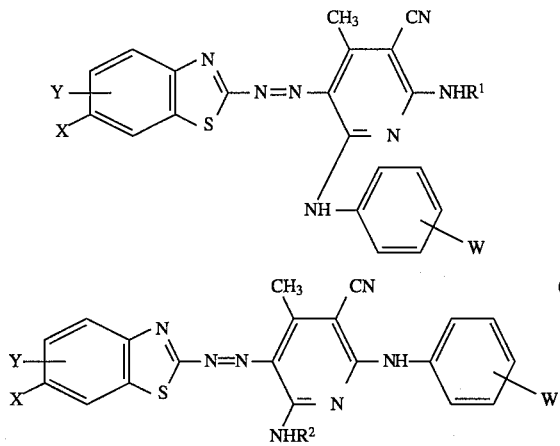

wherein X is a halogen atom, a nitro group, a cyano group, a thiocyanate group, a methylsulfonyl group, a $C_1$ or $C_2$ alkylcarbonyl group, a $C_1$–$C_4$ alkoxycarbonyl group or a vinylsulfonyl group, Y is a hydrogen atom, a halogen atom, a cyano group, a trifluoromethyl group or a methylsulfonyl group, W is a hydrogen atom, a halogen atom, a $C_1$ or $C_2$ alkyl group or a $C_1$ or $C_2$ alkoxy group, and each of $R^1$ and $R^2$ which are independent of each other, is a hydrogen atom, a $C_1$–$C_8$ alkyl group, or a $C_2$–$C_4$ alkyl group substituted by a halogen atom, a hydroxyl group, a cyano group, an alkoxy group, an alkoxyalkoxy group, a hydroxyalkoxy group, a hydroxyalkoxyalkoxy group, an acyloxyalkoxy group or an acyloxyalkoxyalkoxy group, provided that each alkoxy group has from 1 to 4 carbon atoms.

2. The disperse dye mixture according to claim 1, wherein in the formulas (I) and (II), X is a halogen atom, a nitro group, a cyano group, a methylsulfonyl group or a vinyl-sulfonyl group, Y is a hydrogen atom or a halogen atom, and each of $R^1$ and $R^2$ is a $C_2$–$C_4$ alkyl group substituted by a $C_1$–$C_4$ alkoxy group or a $C_1$–$C_4$ alkoxy $C_1$–$C_4$ alkoxy group, and the dye of the formula (II) is blended at a ratio of from 0.4 to 3 times by weight to the dye of the formula (I).

3. A method for dyeing a polyester fiber or polyamide fiber, which comprises dyeing said fiber with a disperse dye mixture as defined in claim 1.

4. A method for dyeing a polyester fiber or polyamide fiber, which comprises dyeing said fiber with a disperse dye mixture as the defined in claim 2.

* * * * *